United States Patent [19]
Behr et al.

[11] Patent Number: 5,396,370
[45] Date of Patent: Mar. 7, 1995

[54] PROCESS FOR EVALUATING BINARY DATA OF A MAGNETIC STORAGE CARD

[75] Inventors: Hubert Behr, Paderborn; Wolfgang Fick, Borchen; Waldemar Jäger, Paderborn, all of Germany

[73] Assignee: Siemens Nixdorf Informationssysteme AG, Paderborn, Germany

[21] Appl. No.: 147,325

[22] Filed: Oct. 21, 1993

Related U.S. Application Data

[62] Division of Ser. No. 768,720, Oct. 25, 1991, Pat. No. 5,285,328.

[30] Foreign Application Priority Data

Mar. 1, 1990 [DE] Germany .................. 4006426.3

[51] Int. Cl.⁶ .................. G11B 25/04; G11B 5/09
[52] U.S. Cl. .................. 360/2; 360/43; 235/449
[58] Field of Search .................. 360/2, 40, 43, 46, 51, 360/53; 235/436, 449, 482

[56] References Cited

U.S. PATENT DOCUMENTS

| | | | |
|---|---|---|---|
| 3,684,967 | 8/1972 | Kelly | 328/63 |
| 4,267,595 | 5/1981 | Hernandez | 375/95 |
| 4,626,670 | 12/1986 | Miller | 360/2 |
| 4,742,403 | 5/1988 | Troletti | 360/45 |
| 5,019,696 | 5/1991 | Chang et al. | 360/2 |
| 5,229,894 | 7/1993 | Collins et al. | 360/43 |

FOREIGN PATENT DOCUMENTS

| | | |
|---|---|---|
| 0034055 | 10/1984 | European Pat. Off. . |
| 0345986 | 12/1989 | European Pat. Off. . |
| 2945519 | 5/1980 | Germany . |
| 2718490C2 | 9/1985 | Germany . |
| 3714244A1 | 11/1988 | Germany . |
| 3839749A1 | 7/1990 | Germany . |

OTHER PUBLICATIONS

"International Standard (ISO) 7811/2", Part 2.
"System Technology/Integrated Circuits", *Computer Design*, Jul. 1987, pp. 27–31.

*Primary Examiner*—Donald Hajec
*Assistant Examiner*—Won Tae C. Kim
*Attorney, Agent, or Firm*—Varnum, Riddering, Schmidt & Howlett

[57] ABSTRACT

A process of scanning and evaluating binary data stored on a magnetic track of a magnetic storage card includes a calibration at the beginning of the scanning operation with certain information stored on the card and a determination of a calibrated time interval. A time curve of the output signal in the calibrated time interval is registered and compared to predefined curve patterns in order to determine deviation of the registered time curve from the curve patterns. A curve pattern showing a least deviation from the registered time curve is identified. The curve pattern may be selected on the basis of information obtained from a previously determined output signal curve. Also, the extreme values are detected to obtain information stored on the card.

19 Claims, 13 Drawing Sheets

PROCESS FOR EVALUATING BINARY DATA OF A MAGNETIC STORAGE CARD

This is a division of application Ser. No. 07/768,720, filed Oct. 25, 1991, now U.S. Pat. No. 5,285,328.

BACKGROUND OF THE INVENTION

1. Field of the Invention

This invention relates to reading information from magnetic cards and more specifically to a method for evaluating binary data stored in a magnetic track on a magnetic storage card.

2. Prior Art

Magnetic cards have found a wide range of application in the private and commercial sector, for instance as personal identification, as check-cards, as key-cards, etc. The information is stored on one or more tracks in a particular standardized code, such as the code described in International Standard (ISO) Ref. No. 7811/2-1985 (E), referred to as a two-frequency code. In a two-frequency code, flux changes, which are magnetic flux lines with alternating polarities, are imprinted on the track in fixed intervals. To indicate a binary value of 1, an additional flux change is inserted midway between two such fixed flux changes. If this additional flux change absent, then the interval indicates the binary value 0. In order to read this magnetic information, the magnetic track is passed by an electromagnetic transformer with a more or less constant velocity, for instance by using a motor to move the magnetic card relative to a fixed transformer, or by passing a movable transformer over the stationary card, or by a person passing the magnetic card, by hand, lengthwise through a slot in which the transformer is mounted.

Due to this scanning movement, a voltage is induced in the transformer following the electrodynamic principle, the polarity of which depends on the polarity of the magnetic flux located on the magnetic track. Since the scanning velocity can vary greatly, the length of the time intervals between the flux changes, or rather the induced voltage impulses, must be determined by a calibration before the actual information can be read. For this purpose, according to the mentioned International Standard (ISO), flux changes are imprinted on the magnetic track in intervals indicating the binary value 0, on a sector which precedes the actual information.

In order to guarantee the safe reading of the stored information, the technical and physical properties of a magnetic card must generally lie within certain tolerance limits. This is the case with new and seldom used magnetic cards, but with increasing wear and age these properties of the magnetic card can change negatively. For instance, the card's surface form may be changed by mechanical and thermal influences, and may become bent or rippled. Signs of use, such as scratches, abrasion, dirt or hairline cracks may appear. Furthermore, the magnetic flux imprinted on the magnetic track may be weakened by superimposed interfering magnetic flux and through the influence of temperature. In addition to such changes in the magnetic card's properties, wear of the electromagnetic transformer, such as surface abrasion incorrect magnetization, as well as the presence of dirt, may inhibit the production of voltage impulses. These changes in the magnetic card's as well as the transformer's properties may cause the voltage impulses emitted by the transformer to be layered with interference signals which may either simulate binary information, or deform the curve of voltage impulses to such an extent that it lies outside of a given evaluation-range within which the signal could still be evaluated safely. As a result of this, the stored information may be read incorrectly or incompletely. The magnetic card at that point can no longer serve its intended function and has become worthless for its user.

In the commonly known process for reading a magnetic card, binary information is obtained through an analog evaluation of the voltage impulses. This evaluation is generally preceded by an amplification of the voltage impulses, which are then low-pass filtered and rectified. In order to recognize the maximum values of the rectified voltage impulses, which, as will be explained later, are used to determine the time intervals between impulses and thus gain the stored information, the time curve of the voltage impulses is differentiated and a discrimination circuit transforms the result into square wave impulses, the rising edges of which determine the time points of the maximum values. Through the use of these square wave impulses it becomes possible to register the voltage impulses at their maximum value and to evaluate the correlative time intervals between the voltage impulses in order to obtain the stored information.

However, such an evaluation will yield usable results only with magnetic cards which are in excellent condition. Should the voltage impulses be layered with interference signals, as described earlier, then the differentiation will produce interference impulses. The rising edges of the subsequently produced square wave signal will no longer define the extreme value of the voltage impulses, but rather the extreme value of the interference signal. Thus the time intervals between the voltage impulses will be incorrect, and the binary information stored on the magnetic track will be evaluated erroneously.

Thus it is an object of this invention to describe a process for the evaluation of binary information which will guarantee the reliable evaluation of the information stored magnetically on the magnetic track of a magnetic storage card, even if the magnetic track and/or the electromagnetic transformer is impaired by the effects of age, dirt, or other damage.

SUMMARY OF THE INVENTION

In accordance with one aspect of this invention, the time curve of the electromagnetic transformer's output signal is registered in specific time intervals determined by calibration. An extreme value which arises in this curve is detected, and the type of this extreme value (maximum or minimum) is compared to the type of a previously detected extreme value.

This solution is based on the assumption that those interference signals which may simulate binary information appear on a random basis during the scanning of the magnetic track. If the reading of the output signal curve occurs only in predetermined time intervals, then the interference signals which lie outside of the reading window will be screened out. Assuming that the interference signals appear with a more of less equal probability throughout the curve of the output signal, the probability that the magnetic card will be rendered unreadable by interference signals is reduced by a factor which results from the quotient of the length of the entire scanning operation and the summation of the reading times during one scanning operation. Since the reading time can be very short, in a digital reading operation, depending on the sample-and-hold chip and the A/D convertor used, it can lie in the microsecond range, the reliability of the evaluation can be improved considerably through the application of this process.

In the time intervals predetermined by the calibration an extreme value for the output signal will be detected, and its type, i.e., being either a minimum value or a maximum value, will be compared with the type of the extreme value that was detected in the previous interval. The detection of the extreme value takes place without regard to the output signal voltage amplitude, so that its level does not play a role in the evaluation. This means that the evaluation of information is possible even at lower output levels, caused by weakened magnetic flux on the magnetic track or by a fluctuating clearance between the transformer and the magnetic track.

The result of the comparison between the type of the current extreme value and the type of the previous extreme value will allow the binary value 1 or 0 to be identified. This shall be clarified by means of an example. According to the previously mentioned two-frequency code, the time intervals between voltage impulses which represent the binary value 0 are twice as long as the time intervals which represent the binary value 1. The duration of the time interval which represents the binary value 0 has been determined through the calibration. Should an extreme value of a particular type, for instance a maximum value or a minimum value, be detected during such a time interval, and should the extreme value that was detected in the previous time interval be of the same type, then this means that an extreme value of a different type must be located between these two extreme values. This is necessarily so because consecutive voltage impulses have opposite polarities by definition, and therefore extreme values of differing types in the output signal curve. Thus, when two extreme values are of the same type, the binary information contained in the output signal curve represents the value 1. If in the time-interval of the scanning appearing two consecutive extreme values are of different types, i.e., a maximum value followed by a minimum value or vice versa, then the information being represented is the binary value 0.

In a preferred embodiment of the invention a time segment is specified for each reading operation. This measure facilitates a more reliable detection of an extreme value as well as the determination of that value's chronological position in the time segment, which allows more than one value of the output signal to be examined within one time segment. The length of the time segment can be varied according to the application requirements. When the transformer's output signal is only slightly disrupted a short time segment length will suffice, whereas it will be beneficial to raise the length of the time segment correspondingly as the output signal interference increases. The extreme value can then be selected from a greater number of output signal values, and relative maximums and minimums in the output signal curve can be sorted out. The larger the number of these values, the more precisely it will be possible to determine the extreme value as well as its type. It is, on the other hand, to be considered that as the length of the time segment increases, so does the influence of interference signals. In practice, a time segment length of shorter than 1/6 of the time interval length determined by the calibration has proven effective for many applications.

In accordance with another aspect of the invention, consecutive extreme values of differing types in the time curve of the transformer's output signal are recognized, the time between these extreme values is measured, the relation of this time to the time intervals specified by the calibration is evaluated for the acquisition of information, and in the further course of evaluation the next time measurement is not started until the next extreme value, if the time between extreme values is shorter than the calibrated time intervals.

In this solution the extreme values that appear in different time intervals in the output signal of the transformer are analyzed in order to obtain the binary information. These values are independent of the absolute voltage level, since they are defined relative to their surrounding values. Thus they form maximum values when the surrounding values are lower, and minimum values when the surrounding values are higher. If the magnetic coupling between the magnetic flux on the magnetic track and the transformer should be weakened by dirt or by increased distance between the transformer and the magnetic card, the voltage impulse induced by scanning the magnetic track will be correspondingly reduced. This does not only apply to the impulse peak, but also to all its surrounding voltage values, so that the extreme value will still be defined clearly in comparison with its surrounding values. Consequently, the influences which cause a weakening of the transformer's output signal will for the most part not affect the evaluation of the binary information contained in the output signal.

The binary states of the information contained on the magnetic card are ascertained through time measurement. The result of this measurement is compared with the time intervals which was determined by the calibration using the preliminary data. If the measured time between two successive extreme values with the binary value 0 and of different types, i.e., a maximum value follows a minimum value or vice versa, approaches this time interval, then the magnetic information that was read from the magnetic track carries the binary value 0. If the measured time is shorter than this time interval, then the binary value is 1. After a recognized extreme value, for instance a maximum value, the time to the next extreme value of a different type, here a minimum value, is measured. In reference to the given example, this means that other maximum values which might fall within this time will be ignored. This measure increases the system's resistance to interference. When the binary value 0 is recognized, the next time measurement will be started at that extreme value which ended the previous time measurement, and the time until the arrival of the next extreme value of a different type will be measured. However, if the binary value 1 is recognized, the next time measurement will not be started with the extreme value which ended the previous time measurement, but rather the extreme value following this one. This measure ensures that the time measurements will always be started at those impulses that have the same period as the time intervals established during the calibration. Voltage impulses with a shorter period, i.e., a higher frequency, will not start a new time measurement. Thus the time measurements have a definite point of reference, and misinterpretations of the voltage impulses appearing in the output signal or high frequency interference impulses will be avoided.

In a preferred form of this method, the measured time is compared with 0.7 times the time intervals determined by the calibration. In the two-frequency code, flux changes with the binary value 0 have twice as long a time interval as those with the binary value 1. When the measured time between two extreme values of different type is compared with 0.7 the calibration time interval, then the measured times for the binary value 1 and the binary value 0 will, in a normal case, have the same difference in length of time from the reference value. This difference in length of time can be considered an interference interval for identifying a binary value. Through these added process steps the interference interval becomes equally long for both binary values, that is, 0.3 times the calibration time interval. Both binary information states will be registered with the same interference interval, and the reliability of the evaluation process is thus increased further.

This discussed form of this method can be further developed so that the ascertained information is tested for errors, and that upon the detection of an error the measured time is compared with 0.7 to 0.66 times or with 0.7 to 0.75 times the calibration time intervals.

This measure increases the resistance of the described evaluation process to interference even further. Should a read-error be discovered, for instance by a parity-bit test, then it is possible that this error occurred because the interference interval, formed by the time distance from the reference value, was too small. Depending on whether this error occurs at the identification of the binary value 1 or the binary value 0, the interference interval will be lengthened in one of two directions, according to the measures mentioned above. It is also possible, upon detection of an error, to increase the interference interval in an arbitrary direction. If the succeeding error test should detect another error, then the interference interval would be increased in the other direction. In this way, the interference interval would be increased in the direction which counteracts the error by at least the second attempt.

In accordance with a third aspect of the invention, the time curve of the output signal is registered over each time interval determined through the calibration, at least one curve pattern is predetermined for each binary state of the information, the registered curve of the output signal is compared with at least two curve patterns, and the comparison yielding the smallest deviation is determined.

This solution is based on the assumption that the time curve of the output signal has a characteristic waveform for each binary state of the information. This waveform can be specified for each binary state in the form of at least one curve pattern. If the actual curve coincides with one of the curve patterns, then there exists a very high probability that the binary information represented by the output signal curve has the value which is assigned to the corresponding curve pattern.

This third solution compares the output signal curve of one calibration time interval with at least two curve patterns, which are assigned to the binary states 0 and 1. Since the actual output signal curve is going to deviate from the theoretical curve, due to layered interferences, it will generally be impossible to establish a precise match between the comparison patterns and the output signal curve. Because of this, the amounts of deviation of the pattern's curve from the curve of the output signal are determined, and the curve pattern with the lowest deviation is identified. This pattern is the most similar to the actual output signal curve and the binary value specified for the pattern will be assigned to the information from the magnetic track.

If the output signal curve is layered with an interference signal, or if its waveform should change due to damping, then the deviations measured in the comparisons with the curve patterns will increase. As long as the respective deviations from the expected output signal do not grow too large, it will be possible to identify the binary information of the output signal positively. Since the respective waveforms for the different binary values are very dissimilar and since this dissimilarity will also affect the deviations, it will be possible to obtain a reliable information even with a very noisy output signal curve or with heavily damped output signals.

In a variation of the third solution, a straight line with a constant positive or negative slope will be provided as the curve pattern for the binary value 0, and a straight line with first a constant positive and then a constant negative slope, or vice versa, with the slope change occurring the middle of the time interval, will be provided as the curve patterns for the binary value 1.

The mentioned curve patterns are characteristic of the output signal curves for the binary values 0 and 1, respectively. It has to be determined whether the output signal has a maximum or minimum value at the start of the reading. Therefore, a straight line with a constant positive slope resembles an output signal curve that represents the binary value 0 and begins with a negative voltage impulse. A straight line with a constant negative slope resembles an output signal curve which represents the binary value 0 and begins with a maximum value. At binary values of 1 another voltage impulse will appear between the calibration time intervals. Hence a straight line in the shape of an upside-down V resembles a voltage curve which begins with a minimum value, and a straight line in the shape of a V resembles a voltage curve which begins with a maximum value.

The mentioned waveforms of the curve patterns can be realized with low programming expense when the evaluation process is realized on a digital computer. It is also possible to determine the deviations of such curve patterns from the actual output signal curve with little calculation, so that the evaluation requires only short amounts of time.

In accordance with a further aspect of the invention, the deviation of the output signal's time curve from the curve of the particular curve pattern with the lowest deviation is determined, a correction of the curve pattern is undertaken based on this determined deviation, and in the further course of evaluation this corrected curve pattern is compared with the output signal curve and is itself corrected.

As mentioned, the voltage amplitude of the transformer's output signal can be damped, or the signal curve may have altered waveforms. Reasons for this are, for instance, the abrasion of the transformer head, dirt, deposits, changes in the magnetic field strength, etc. The mentioned development facilitates a continual adaptation of the curve patterns to the actual curve of the output signal. This allows the deviation of the output signal curve from the curve pattern with the least deviation to become minimal. The deviations from the other curve patterns will remain unchanged, so that the interference interval for identifying the binary information is increased.

In accordance with yet another aspect of the invention, the output signal is converted into digital values at predetermined time intervals, the digital values are stored in the sequence in which they are read, and the stored digital values are evaluated in order to obtain the recorded information.

This development is based on the consideration that evaluation errors can be avoided if the evaluation of the voltage impulses is chronologically not closely linked with the appearances of the voltage impulses at the transformer. This alleviates the necessity for the evaluation to occur in real time, so that it may be preformed at a late time by utilizing the stored digital values, for instance after the magnetic track of the magnetic card has been scanned. This allows all the previously mentioned processes to be applied to all the voltage impulses obtained from one and the same magnetic card, and the performance of the different processes to be compared. The evaluation process can thus utilize more time than is required for scanning the magnetic track.

If the evaluation of digital values occurs sequentially, with different evaluation processes, a new set of binary data will be gained at each evaluation. These different evaluation processes have been described above. Several sets of binary information can then be compared with each other, and the result of this comparison can be subjected to a plausibility test. If the results coincide, then it can be assumed with a very high probability that the information gained is correct. Through this measure the safety and reliability of the evaluation of binary information is increased even further.

In accordance with a further aspect of the invention, a specific evaluation process will be chosen for the further evaluation of the binary values, depending on the results of the plausibility test. This allows that particular evaluation process to be chosen which applies best to the stored digital values of a magnetic card. Optimization criteria may be, for instance, the time requirement or the statistical certainty of a given evaluation process. It is, for example, possible to perform the evaluation of a magnetic card bearing certain dirt deposits in several stages, where a different evaluation process is applied during each stage. It would then be expedient to chose a simple, but fast evaluation process for the first stage. Should this evaluation process yield an incorrect result, then in the second stage a more complex and reliable evaluation process will be applied to the same digital values. The evaluation will be carried on in continuing steps until a flawless result is obtained. The correctness of this result can then be verified through the use of common control processes, such as the parity-bit process.

BRIEF DESCRIPTION OF THE DRAWING

An illustrative embodiment of the invention is described below with reference to the drawing, wherein.

DETAILED DESCRIPTION

Figure 1:
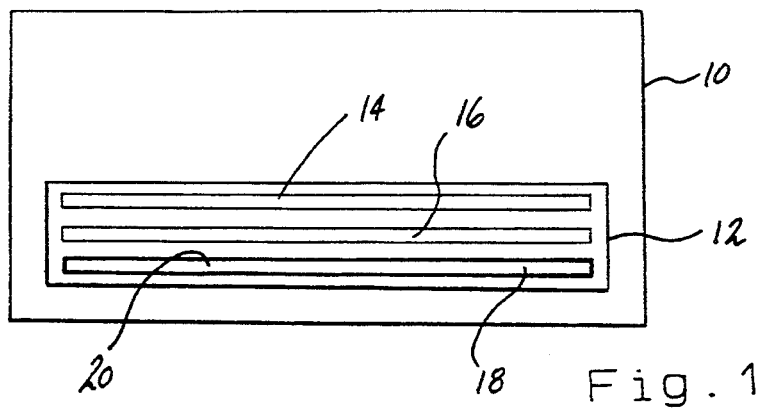
FIG. 1,1a represents a magnetic card with an enlarged section of a magnetic track.
Figure 1A:
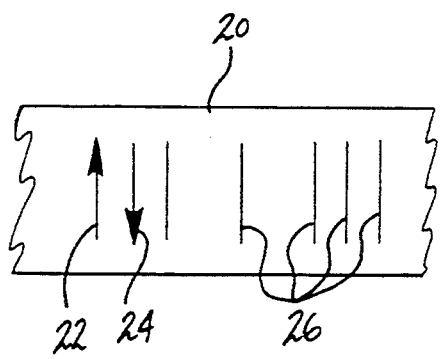

FIG. 1 is a magnetic card 10 bearing a magnetic strip 12, which in turn carries three magnetic tracks 14, 16 and 18. A section 20 of magnetic track 18 is shown enlarged. The magnetic track 20 has been imprinted with lines of magnetic flux 22, 24 and 26. The distance between these lines of flux is varied according to the binary information being depicted, either 0 or 1. Consecutive lines of flux will always alternate in polarity, indicated here by arrows at the lines of flux 22 and 24. Because of this, consecutive lines of flux 22 to 26 are also referred to as flux changes. The number of flux changes per millimeter is known as the flux change density d, being a measure which indicates the number of binary values that can be stored over one unit of distance.

Figure 2:
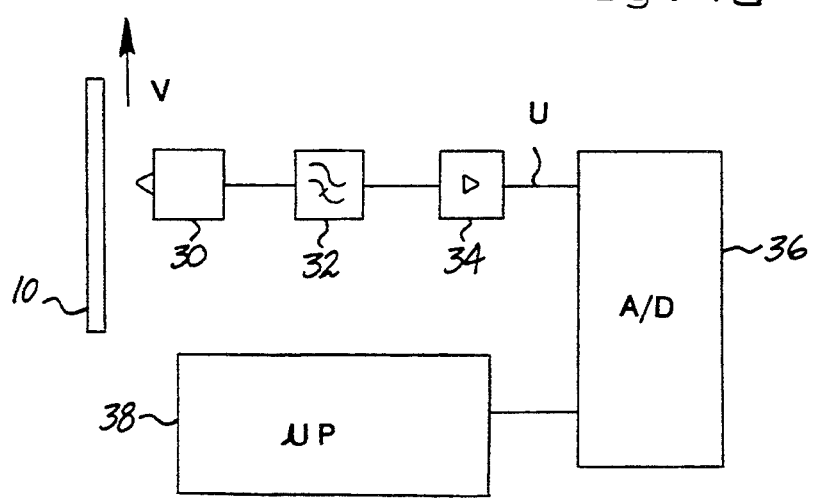
FIG. 2 is a block diagram representation of a circuit arrangement for reading binary information.

FIG. 2 is a block diagram representation of a circuit arrangement for reading the information stored on the magnetic card 10. The magnetic card 10 is passed by an electromagnetic transformer 30 with a velocity v, so that the flux changes sensed in the transformer 30 induce voltage impulses in the transformer's coils. These voltage impulses are passed through a low-pass filter 32, and the filter output signal is amplified by an amplifier 34, resulting in the output signal U. This signal is converted in regulated time intervals by an A/D convertor 36 into digital values. The digital values of the convertor 36 are transmitted to a microprocessor 38, which executes the processing steps for evaluating the binary information.

The frequency of the voltage impulses in the electromagnetic transformer 30 depends on the flux change density d of the magnetic track and the relative velocity v between the magnetic card 10 and the transformer 30. In order to register the curve of the output signal U from the transformer 30 with the highest possible chronological resolution, the sampling frequency of the A/D convertor will be at least 16 times higher than the maximum impulse curve frequency. Therefore the time points for the A/D conversion will have a distance $T_{ad} < (16vd)^{-1}$. At a relative velocity of 200 mm/s and a flux change density d of 8.33 /mm, the sampling frequency is 26656 Hz, i.e., the time $T_{ad}$ is 37.5 microseconds.

Figure 3:
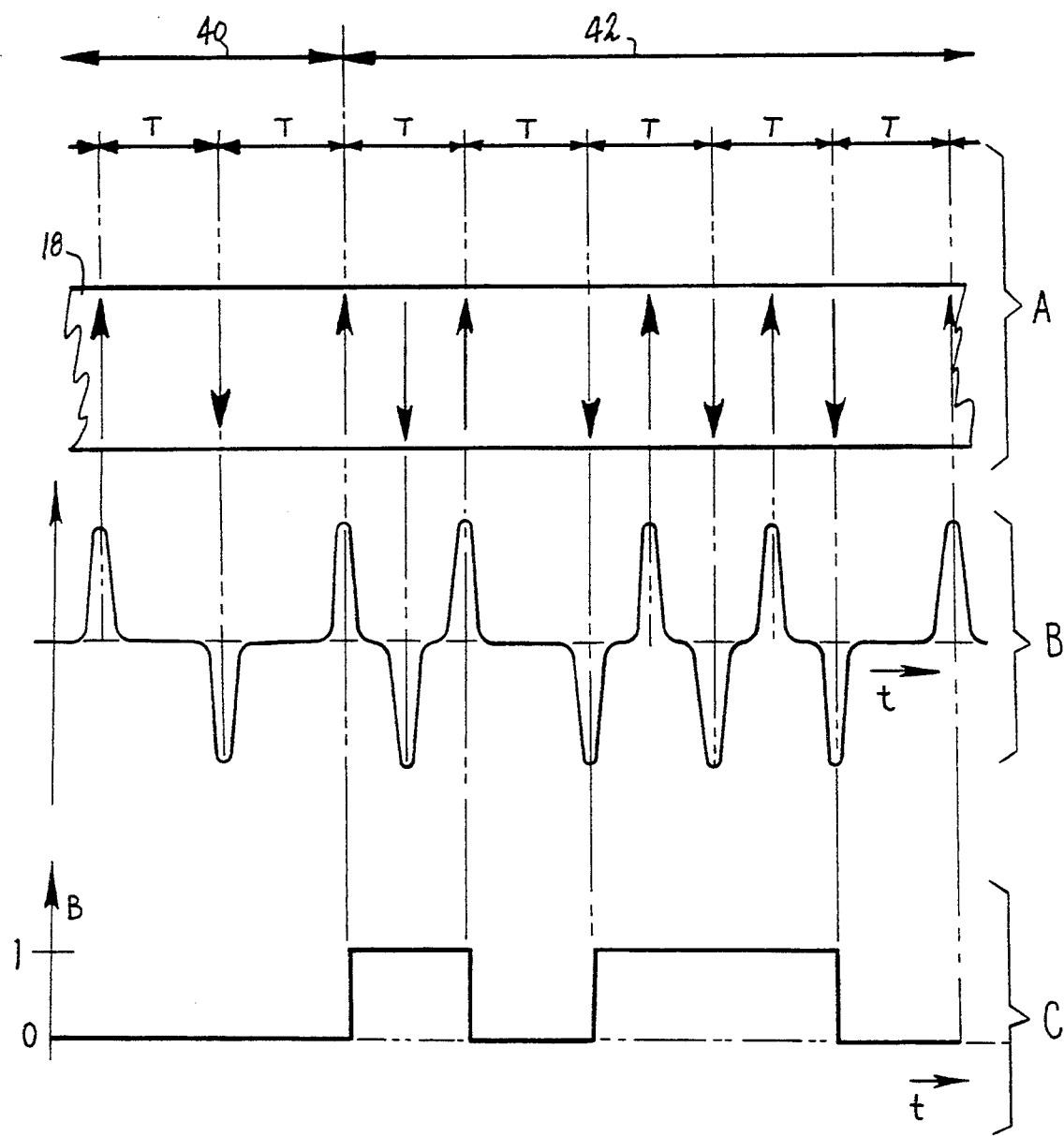
FIG. 3 shows signal curves and binary states in the two-frequency code.

In FIG. 3, portion A) represents flux changes on the magnetic track 18; portion B) is the curve voltage U emitted by the transformer 30 during the scanning of these flux changes, over time t; at the bottom of the figure, in portion C), binary states B, which are dictated by the voltage curve U, are mapped across time t.

The magnetic track has a so-called leading zero sector 40, on which only flux changes that represent the binary value 0 have been imprinted. The leading zero sector 40 is followed by the actual information sector 42, which contains the binary values 0 and 1 as information.

The encoding of the information occurs according to the two-frequency code. In this code, the polarities of successive flux lines alternate. Single flux changes are placed at predetermined distances, which correspond to the time distances T during scanning. If another flux change occurs within the distance T, then the binary value 1 is indicated. If this additional flux change is not present, then the binary value 0 is indicated. When the flux changes are scanned, voltage impulses are induced which are either positive or negative, depending on the magnetic polarity. The curve of these voltage impulses is shown in portion B) of FIG. 3. If the magnetic track 18 contains only information with the binary value 0, then the voltage impulses will appear with only one frequency, i.e., with only one period T. If the magnetic track 18 also contains binary values of 1, then the signal curve will also contain signal portion with double the frequency, i.e., half the period T. Portion C) shows the binary values B which are specified by the predetermined distances that correspond to the time distances T. The binary values are determined only after a respective extreme value change.

Figure 4:
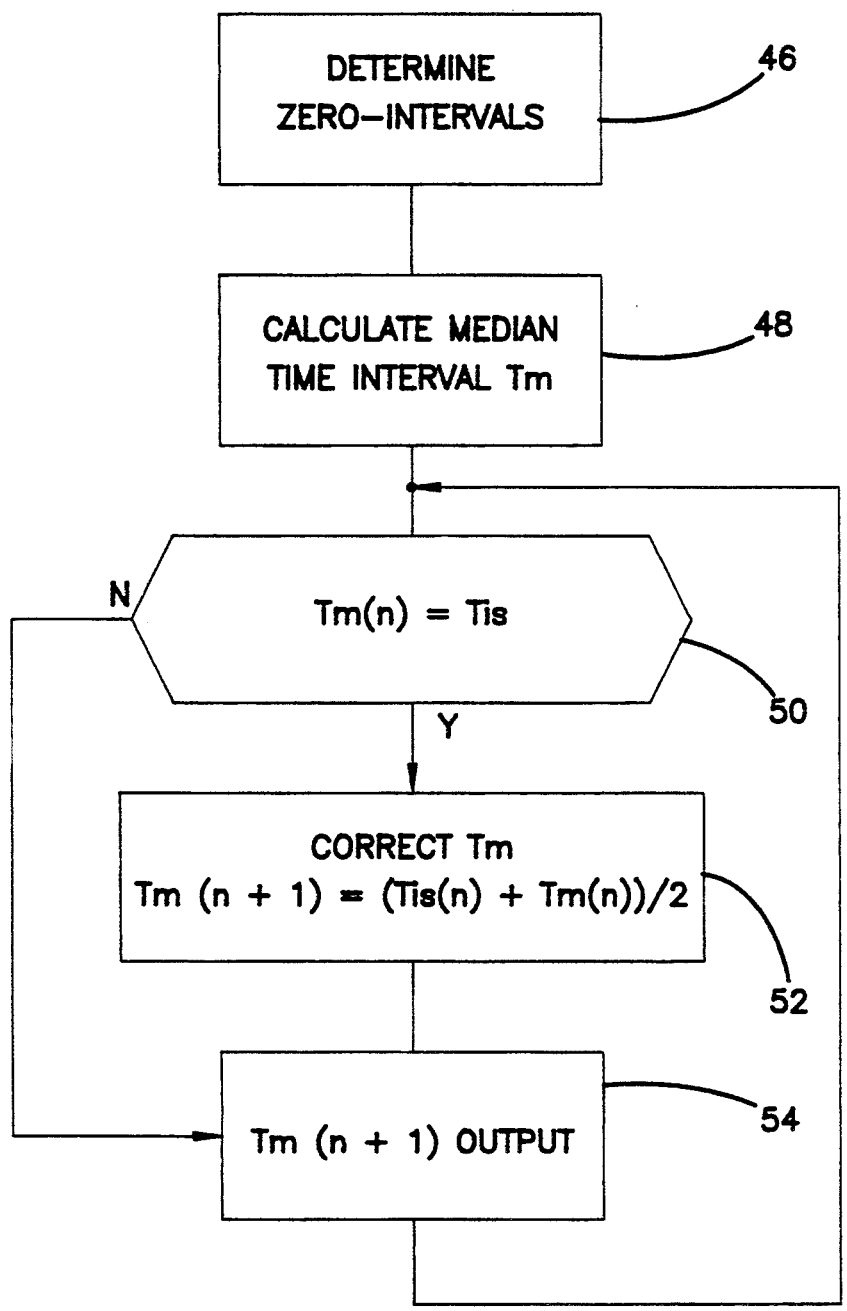
FIG. 4 is a flow chart representation of the steps for determining time intervals during calibration.

Since it is not guaranteed that the relative velocity v between the transformer 30 and the magnetic card 10 will always remain the same for different magnetic card reading devices, it is necessary to perform a calibration which will determine the period T. This is the function of the leading zero sector 40, which is scanned at the beginning of each scanning operation. The time interval T that is assigned the binary value 0 can be determined from the time intervals between the voltage impulses in the preliminary zero sector 40. The process steps required to carry out this operation are describe in the flow chart in FIG. 4.

In a first process step 46, the time intervals T for the binary information 0 are determined through time measurement. The digital values emitted by the A/D convertor 36 can be examined for extreme values toward this end. At a constant sampling frequency of the A/D convertor 36, the number of digital values that lie between the extreme values constitute a measure for the desired time interval T.

In process step 48, a median time interval Tm is calculated from several time intervals T in the leading zero sector. This eliminates time measurement errors. The following process steps 50, 52 and 54 deal with a correction of the median time interval Tm, which is required if the scanning velocity varies during the scanning of the magnetic track 18. For this purpose, as will be explained later, the current time interval Tis for the binary value 0 will be measured continuously during the scanning operation, and the time interval Tm which is required for the evaluation process will be continually corrected. In process step 50, the time interval Tm is compared with the current time interval Tis during the $n^{th}$ evaluation step, and in the case of a deviation between the two, the evaluation will branch to process step 52. In this step the time interval Tm for the next evaluation step n+1 is calculated as an arithmetic mean according to the function specified in process step 52. In process step 54 the result of this correction is then passed on to other evaluation processes and is utilized for further evaluation of the information. After the correction, the evaluation is sent on to process step 50 and the time interval Tm is further corrected.

Figure 5:
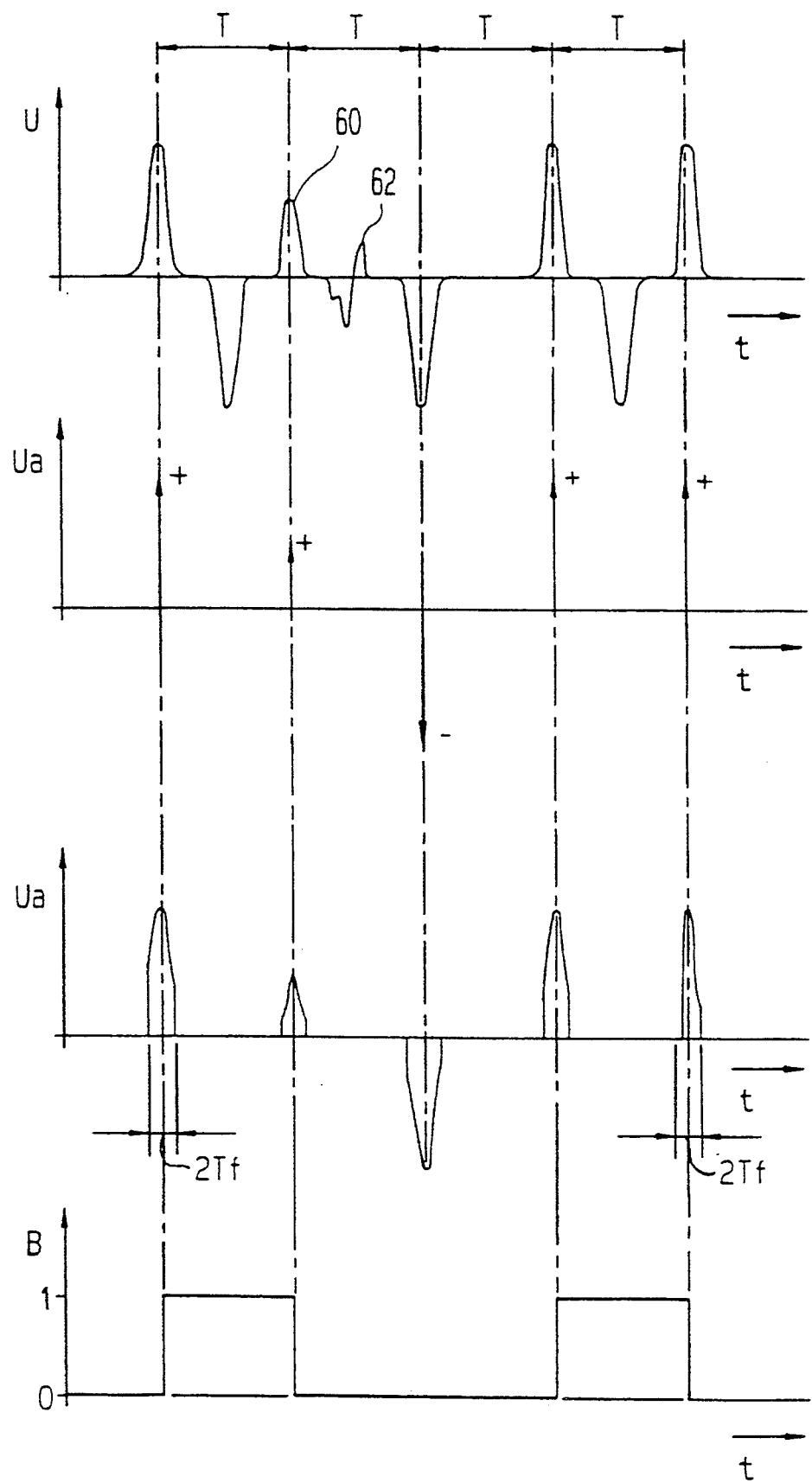
FIG. 5 shows signal curves during evaluation of binary information and a determination of the type of extreme value in a previous time interval.

In FIG. 5 various different signal curves are shown over time t, by which the evaluation process of identifying the types of extreme values in predetermined time intervals is described. Portion a) shows the output voltage curve U of the transformer 30. The voltage curve U is examined for extreme values in segments, and the type of the extreme value, either a maximum value or a minimum value, is determined. This can, for instance, be achieved through a simple assessment of the voltage value's polarity, as indicated in portion b) of the figure. The types of consecutive extreme values are compared to gain information. If the extreme values are of the same type, then the binary value 1 is produced (portion d) in FIG. 5). If the extreme values are of different types, then the binary value 0 is produced. Since the signal curve is examined only in time intervals T, an interference impulse 62 appearing between two scanning operations will not be registered and can therefore not influence the evaluation. The voltage amplitude at moment the signal is scanned also does not affect the evaluation outcome, since the information about the extreme value's type still carried by a weakened voltage pulse 60 is sufficient to identify the binary value 0 or 1.

In portion c) of FIG. 5 the reading operation is carried out in a time segment of 2Tf. Depending on the sampling frequency of the A/D convertor 36, several digital values will by registered during the time segment 2Tf and amongst these an extreme value will be identified. This makes it possible to not only detect the type of the extreme value, but also its chronological position. This can be used for the time measurement of the current time interval Tis to the previous extreme value. The time interval Tis can then be used to correct the time interval T, or rather the median time interval Tm, as described earlier.

Figure 6:
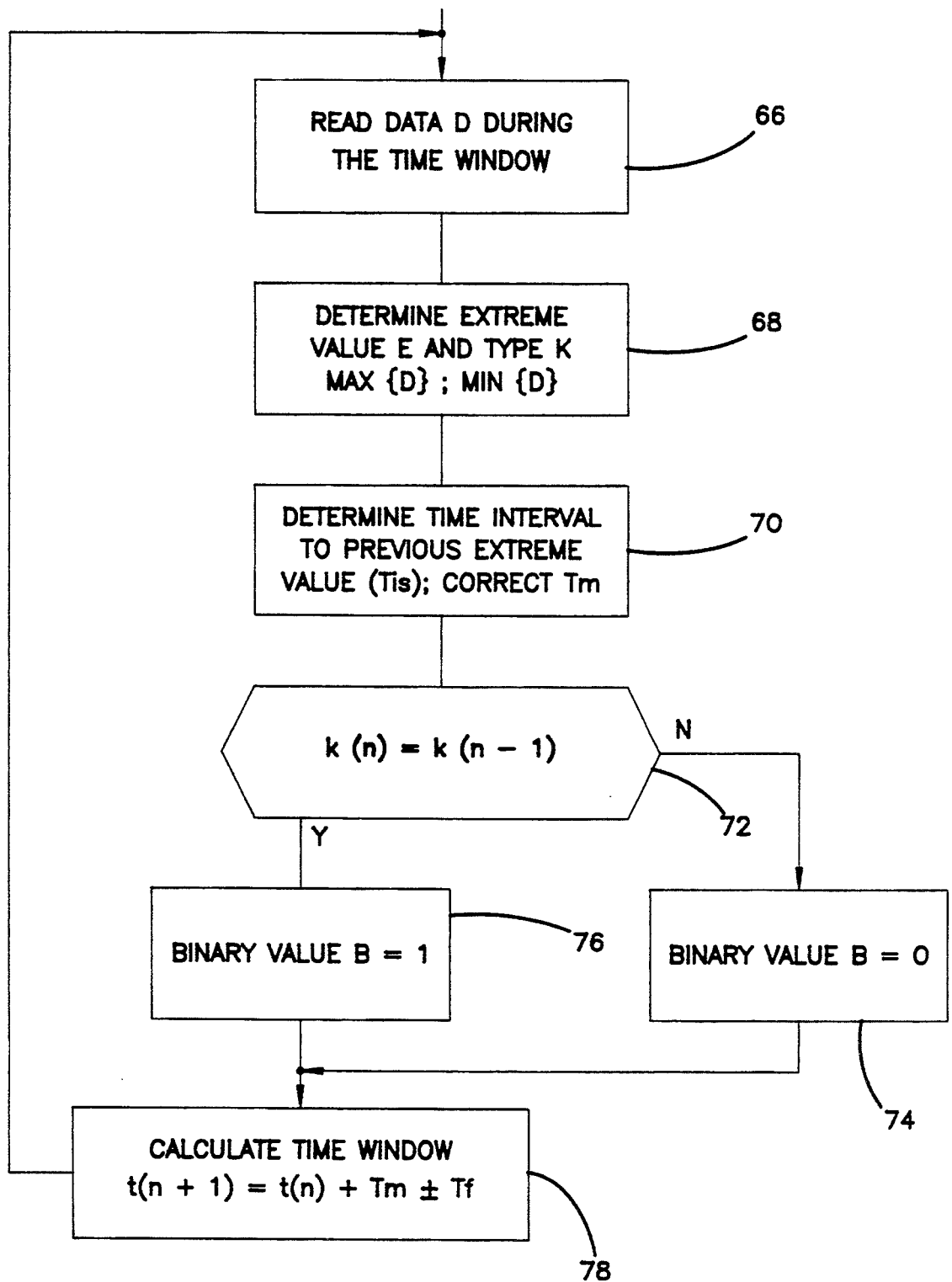
FIG. 6 is a flow chart representation of steps for evaluating binary information with reference to FIG. 5.

FIG. 6 shows the process steps required to ascertain the binary values in FIG. 5. In the first process step 66, data D which coincide with a time segment or a time window 2Tf are read into the microprocessor 38. Then the maximum or minimum value of this data is determined (process step 68). The time interval Tis to the previous extreme value can be calculated from the chronological position of the extreme value (process step 70). This time interval Tis is used to correct the median time interval Tm according to FIG. 4.

In the next process step 72 the type of the current extreme value is determined and compared with the type of the previous extreme value. If the two types are equal, the binary value 1 is emitted, if they are not equal the binary value 0 is emitted (process step 76 or 74). Following this the time points t(n+1) of the next time window are calculated in process step 78. These lie symmetrically distanced ±Tf from the next time point t(n)+Tm.

Figure 6A:
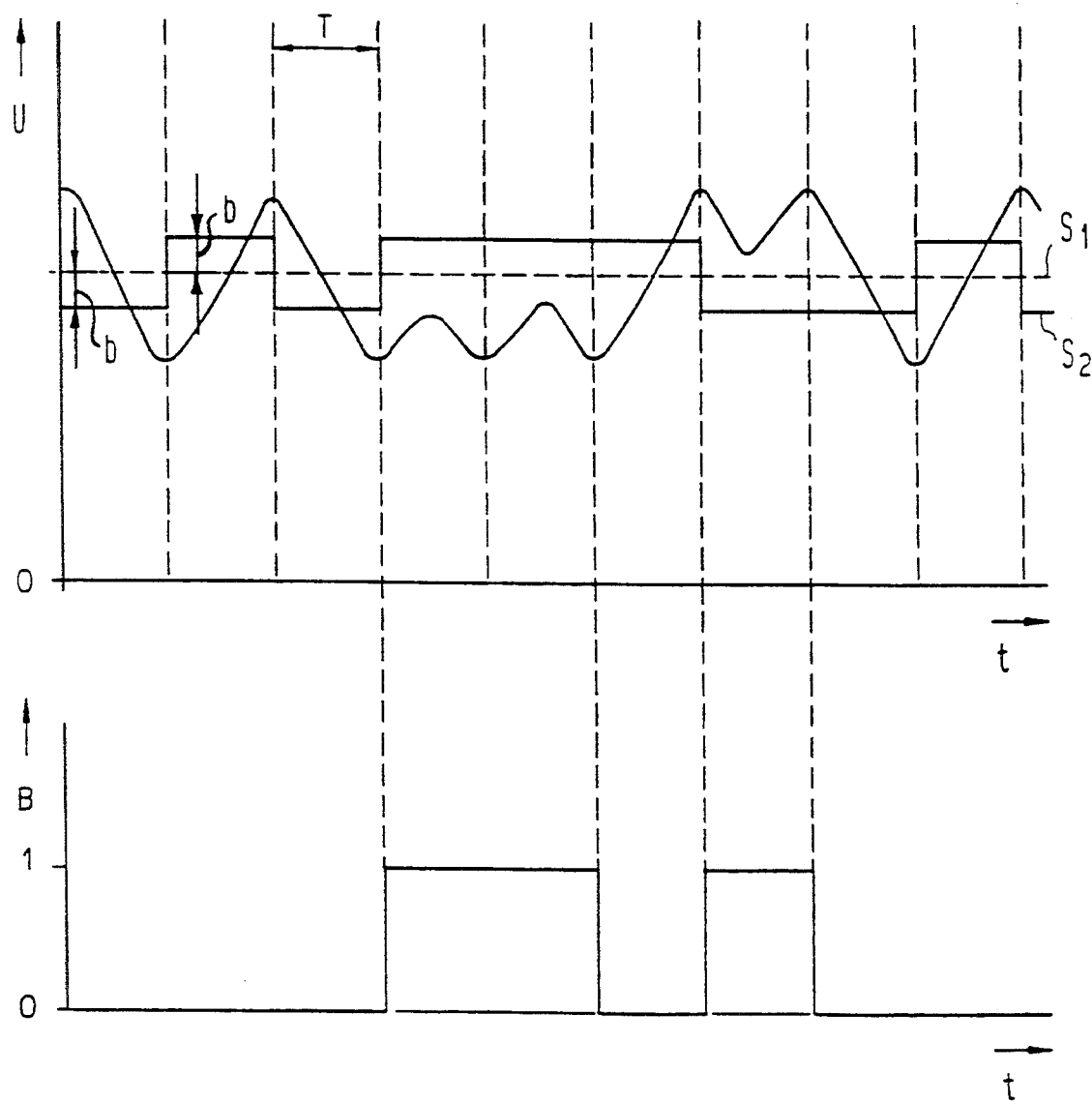
FIG. 6a shows signal curves during the evaluation process of FIG. 6.

In FIG. 6a a variation of the evaluation through detection of the extreme value's type in predetermined time intervals T is illustrated by means of waveforms. The upper portion represents the output voltage curve U of the transformer 30, as it is produced by strongly soiled or partially damaged magnetic cards. For testing purposes such a condition can be simulated by placing adhesive tape over the magnetic track.

The diminished voltage amplitudes of the flux changes with half of the time interval T, representing the binary value 1, are characteristic of this output voltage curve U. This decrease in amplitude is caused by the diminished sensitivity of the transformer 30 at increased distances to the magnetic track. The scanning of the output voltage curve U in the time interval T and the obtainment of the binary values from the extreme values follows the same principles as described earlier in FIG. 5 and 6. Unlike the output voltage U represented in FIG. 5, this voltage has been raised by a constant level so that only positive voltage values occur in the voltage curve U. For the determination of the types of the extreme values these voltages will be compared with a step value, as will be explained later.

In the most simple case the step value will be obtained through an arithmetic mean of the output voltage curve U, for example during the calibration phase, which contains binary values of 0 with a defined voltage amplitude as preliminary information. Such a step value S1 is shown as a dashed line in the upper portion of FIG. 6a. As mentioned before, the types of the extreme values will be determined through comparison with this step value S1. A maximum value is present when the extreme value is smaller than the step value S1. As described before in FIGS. 5 and 6, the binary information B is gained from the relationship between the type of the detected extreme value and the type of the previously detected extreme value. The time curve of this information is shown in the lower portion of FIG. 6a.

In order to raise the interference interval during the detection of the type of the extreme value even further, the step value S1 can be changed, after the detection of a change in extreme value, by an amount b which increases the voltage difference to the last detected extreme value. The application of this principle results in the curve of the step value, marked S2, in the upper portion of the figure. As can be seen by the output voltage curve U in FIG. 6a, this raises the vertical distance between the voltage amplitudes with halved time intervals T and the step value S2 by the amount b. The type of the extreme value, either minimum or maximum, can thus be determined with a high reliability even for small extreme values.

Figure 7:
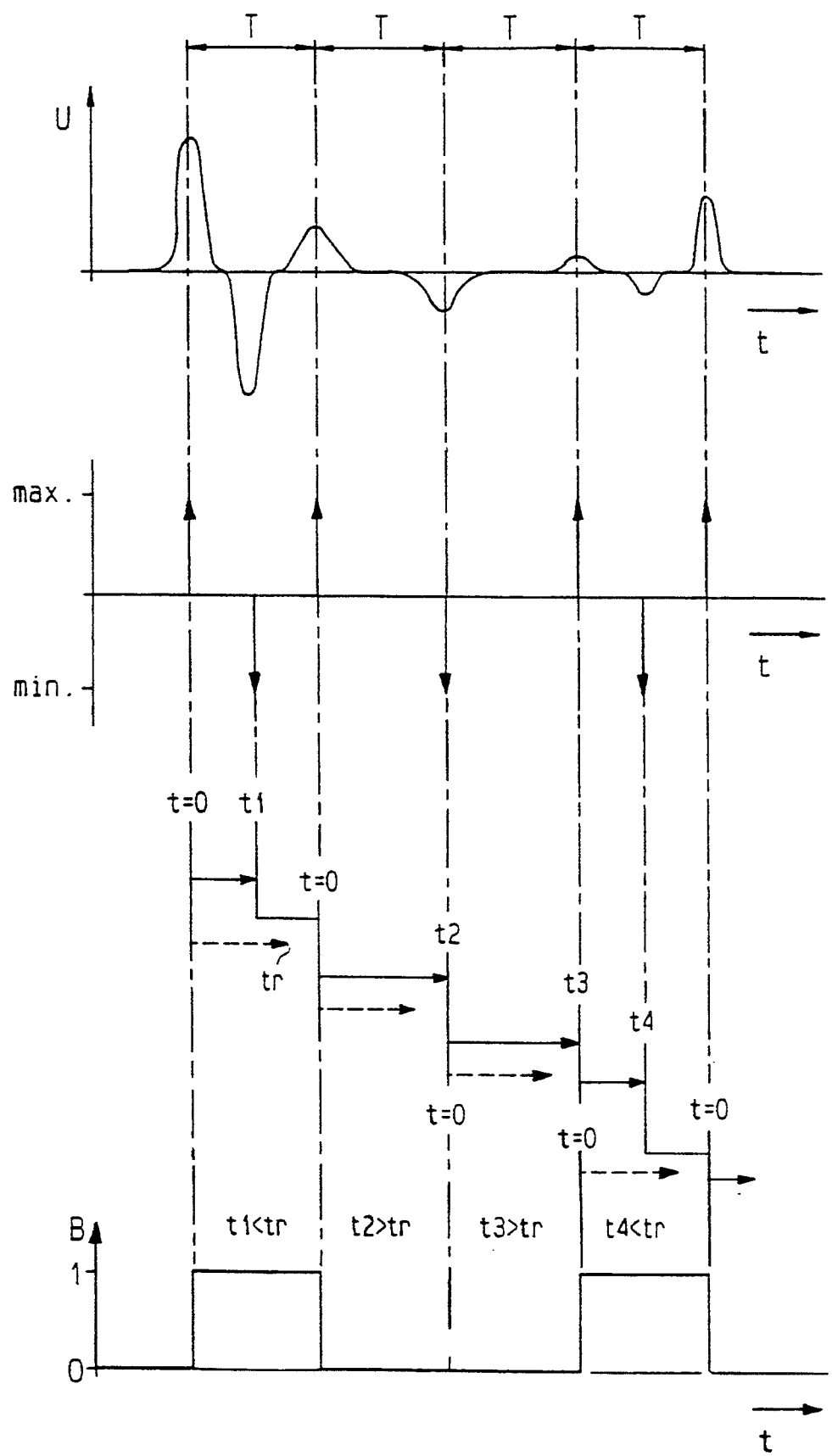
FIG. 7 shows signal curves during the evaluation of binary information through time measurement.

The description of a further version of the evaluation of binary information contained in the output signal curve U of the transformer 30, referring to FIG. 7, follows. In portion a) the output signal curve U, whose voltage impulses are, in part, greatly damped, is represented over time t. The cause of this could be, for instance, a series of clearance fluctuations between the transformer 30 and the magnetic card, caused by dirt on the magnetic card 10 or warps and ripples. For the acquisition of information consecutive extreme values of differing types are detected. The chronological position of these extreme values is represented in portion b) of the figure. Since merely one comparison is carried out between two consecutive extreme values, the result will be independent of the overall voltage of the output signal U. This means, that the weakening of the voltage amplitudes due to interferences will not have an effect on the evaluation of the information.

The gathering of information is represented through portions c) and d) of the figure. At the detection of an extreme value, a time measurement is started at t=0, and the time t1 to the arrival of the next extreme value of a different type is measured. This time t1 is compared with a reference time tr, which is 0.7 times a time interval T or Tm which was determined at the calibration. If the time t1 is smaller than the reference time tr, then the binary value 1 is produced (portion d) of FIG. 7). Thereafter, the next extreme value is detected, at which the time measurement is started anew. In this example, the following extreme value has a time interval t2 from the preceding extreme value. The time t2 is larger than the reference time tr, and thus the binary value 0 is recognized. At the termination of a time measurement for a binary value of 0, the next time measurement is started immediately.

Figure 8:
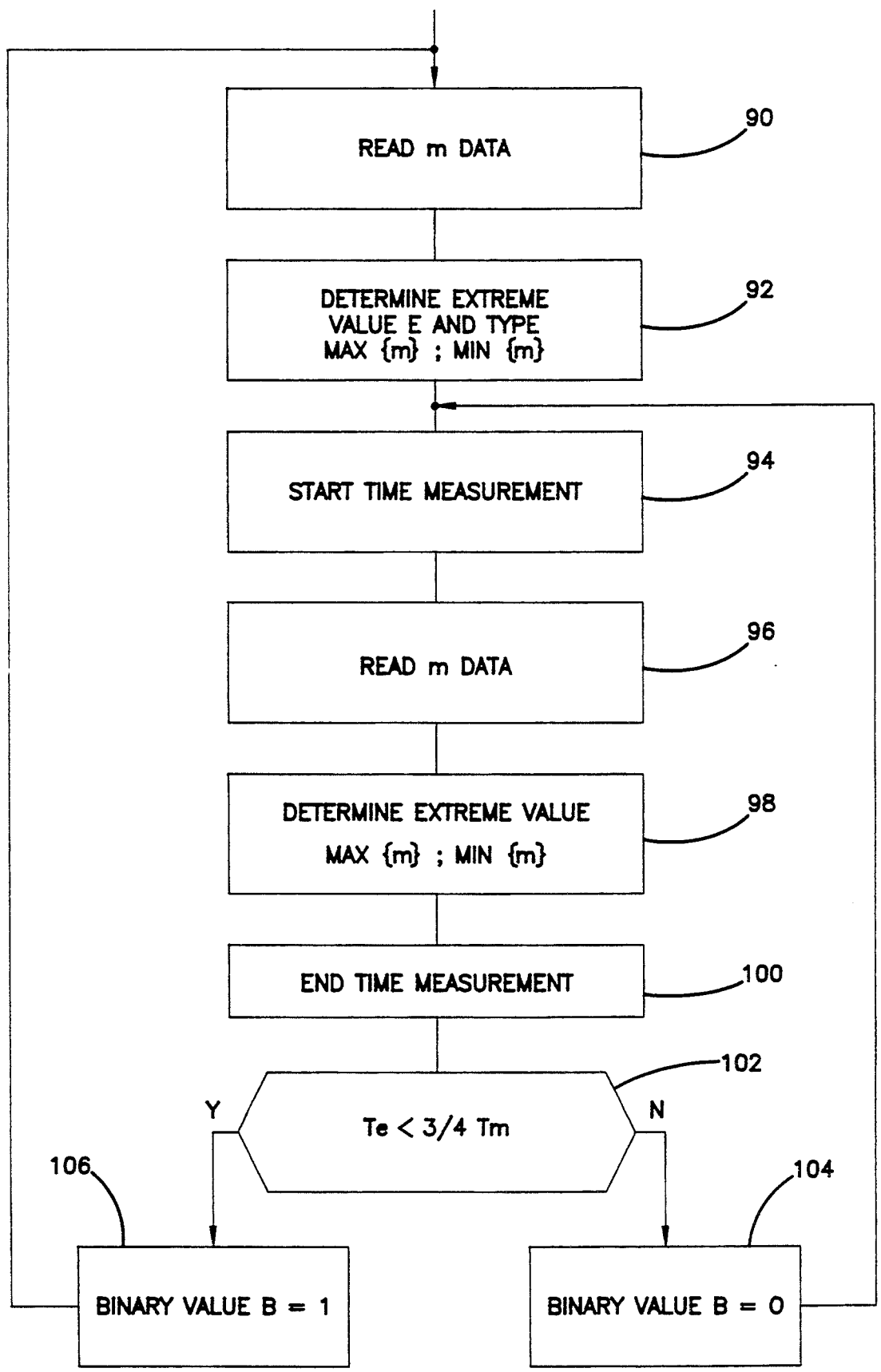
FIG. 8 is a flow chart representation for determining binary information with reference to FIG. 7.
Figure 9A:
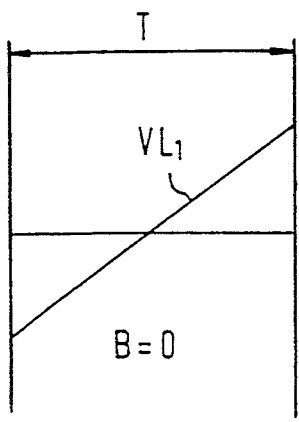
FIGS. 9h and 10c show a plurality of curved patterns and their relationship to a given output signal curve.
Figure 9B:
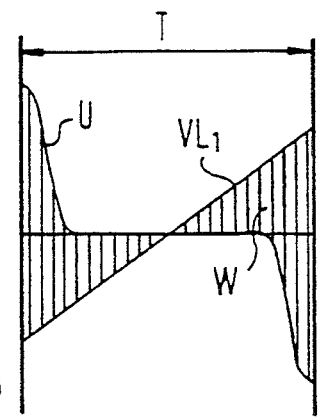
Figure 9C:
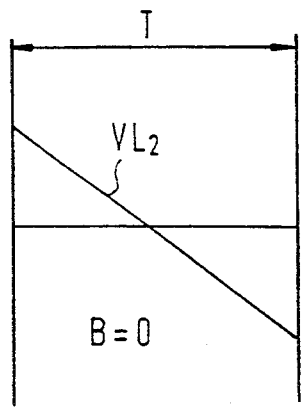
Figure 9D:
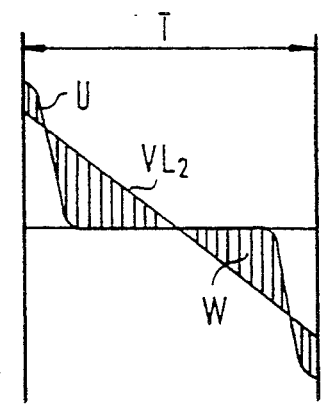
Figure 9E:
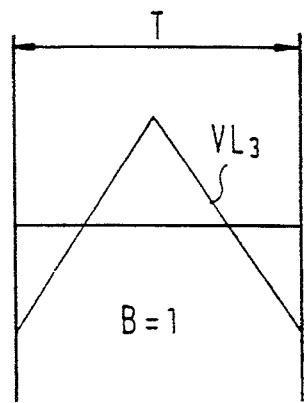
Figure 9F:
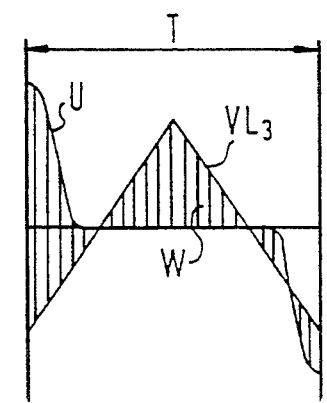
Figure 9G:
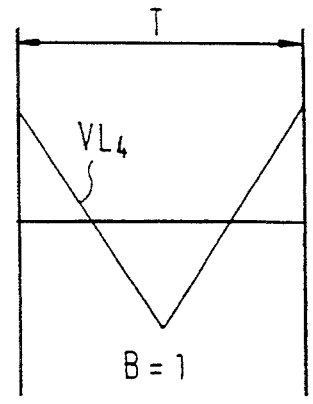
Figure 9H:
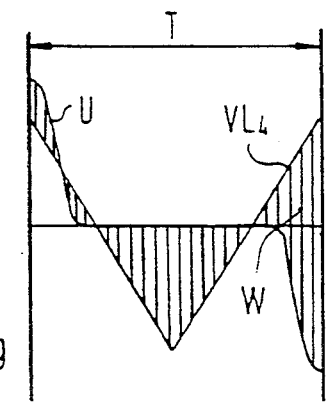

The process steps required for evaluating the binary information according to this process are shown in a flow chart in FIG. 8. In a first process step 90, m bits of digitalized data of the output signal curve U are read into the microprocessor 38. The number m is chosen so that there is at least one value among the m number of digital values which represents a voltage impulse and thus an extreme value of the signal curve U. In the next process step 92 one extreme value will be detected among the m number of data bits and the time measurement will be started (process step 94). Following this, m number of data bits are read in again and the succeeding extreme value is identified (process steps 96 and 98). Upon the detection of an extreme value the time measurement is ended in the next step 100. Since this example employs a digital process with a constant sampling frequency of the A/D conversion, the time measurement can be based on the number of digital values located between the two extreme values. This number is to be multiplied with the time interval Tad between two digital conversions in order to receive the absolute value of the time interval. With a digital process, the time measurement does not need to occur simultaneously with the production of the output signal curve U, but can be carried out at a later time by means of stored values.

The measured time is compared with a reference value tr which is 0.7 times the median time interval (process step 102). If the measured time is greater than the reference time tr, then the binary value 0 is released in step 104, whereupon the evaluation jumps to process step 94 which begins another time measurement. If the measured time is smaller than the reference time tr, then the binary value 1 is produced in process step 106, whereupon the next extreme value is located (process steps 90 and 92). Only then is a new time measurement started.

In a further evaluation process the time curve of the output signal U is compared with curve patterns. Such curve patterns are reproduced in FIG. 9. In the left of portion a) a curve pattern $VL_1$ which is formed by a straight line with a constant positive slope within the time interval T, which corresponds with the calibration time interval, is represented. In the right of portion a) the curve pattern $VL_1$ is shown together with the output signal curve U in a diagram. The deviations between the curve of the output signal U and the curve of the curve pattern $VL_1$ are shown hatched. The sum of deviations corresponds to the hatched area W.

In the left of portion b) a straight line with a constant negative slope is shown as curve pattern $VL_2$. The diagram to the right identifies the sum of deviations of the curve pattern $VL_2$ from the output signal curve U as area W. The curve pattern $VL_2$ has the characteristic form of the output signal curve U for a binary value of 0, since it begins with a positive value (maximum value) and ends with a negative value (minimum value). The same applies to the curve pattern $VL_1$, however with opposite polarities. The curve patterns $VL_3$ and $VL_4$ in the potions c) and d) of the figure give the characteristic forms of the output signal curve U for a binary value of 1, where the an extreme value of a first type is followed by an extreme value of a different type and again by an extreme value of the first type. For the curve pattern $VL_3$ the first extreme value is a minimum value, for the curve pattern $VL_4$ a maximum value. Out of FIG. 9 it follows that the deviation W for the comparison between the curve pattern $VL_2$ and the output signal curve U (portion b) in FIG. 9) has the smallest value. Hence the output signal curve U within the particular time interval T corresponds to the binary value B=0.

In this example the deviation W was determined by the areas between the waveforms of the voltage signal U and the curve patterns $VL_1$ through $VL_4$. This area can be ascertained through summation or integration. A mean value can be formed from these deviations which specifies a standardized measure for the similarity between the curve of the output signal U and the curve of the curve pattern $VL_1$ through $VL_4$. Correspondingly, a quadratic mean deviation of the curves can be formed by cubing and adding the deviations and calculating a mean. With the help of the quadratic mean deviation and/or the median total deviation it is possible to conduct statistical observations of the changes in the waveform of the output signal U. Through this, short- and long-term changes in the waveform, which could for instance be attributed to a systematic interference, can be recognized.

Figure 10A:
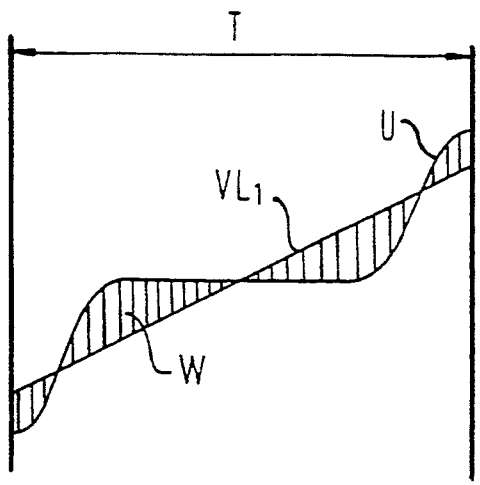
Figure 10B:
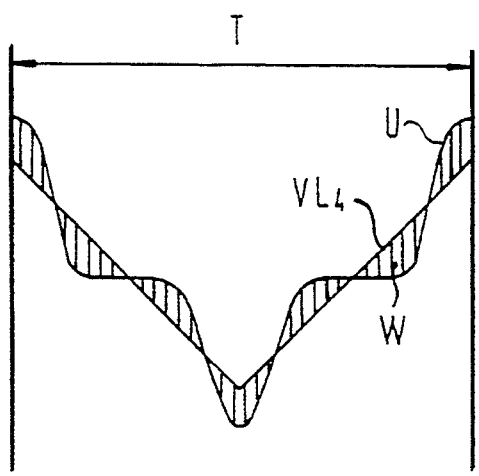
Figure 10C:
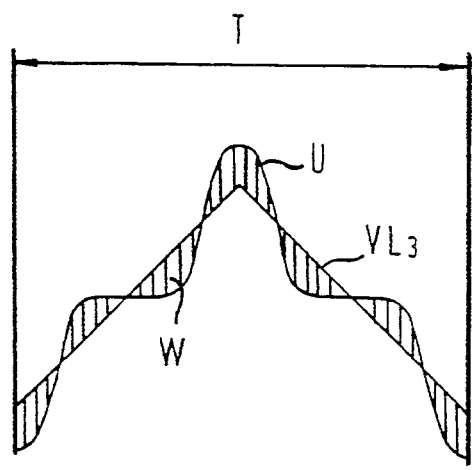

In FIG. 10 three diagrams are represented which show the best match between one of each of the four curve patterns and different variations of the output signal curve U. Portion a) of the figure shows the match for curve pattern $VL_1$ for the binary value 0. In portion b) the match between the curve pattern $VL_4$ and the particular output signal curve U results in the minimal deviation W. Thus the binary value 1, corresponding to the curve pattern $VL_4$, is assigned to the output signal curve U. The match in portion c) is analogous, where, in contrast to portion b), the output signal U begins with a negative voltage value.

Figure 11:
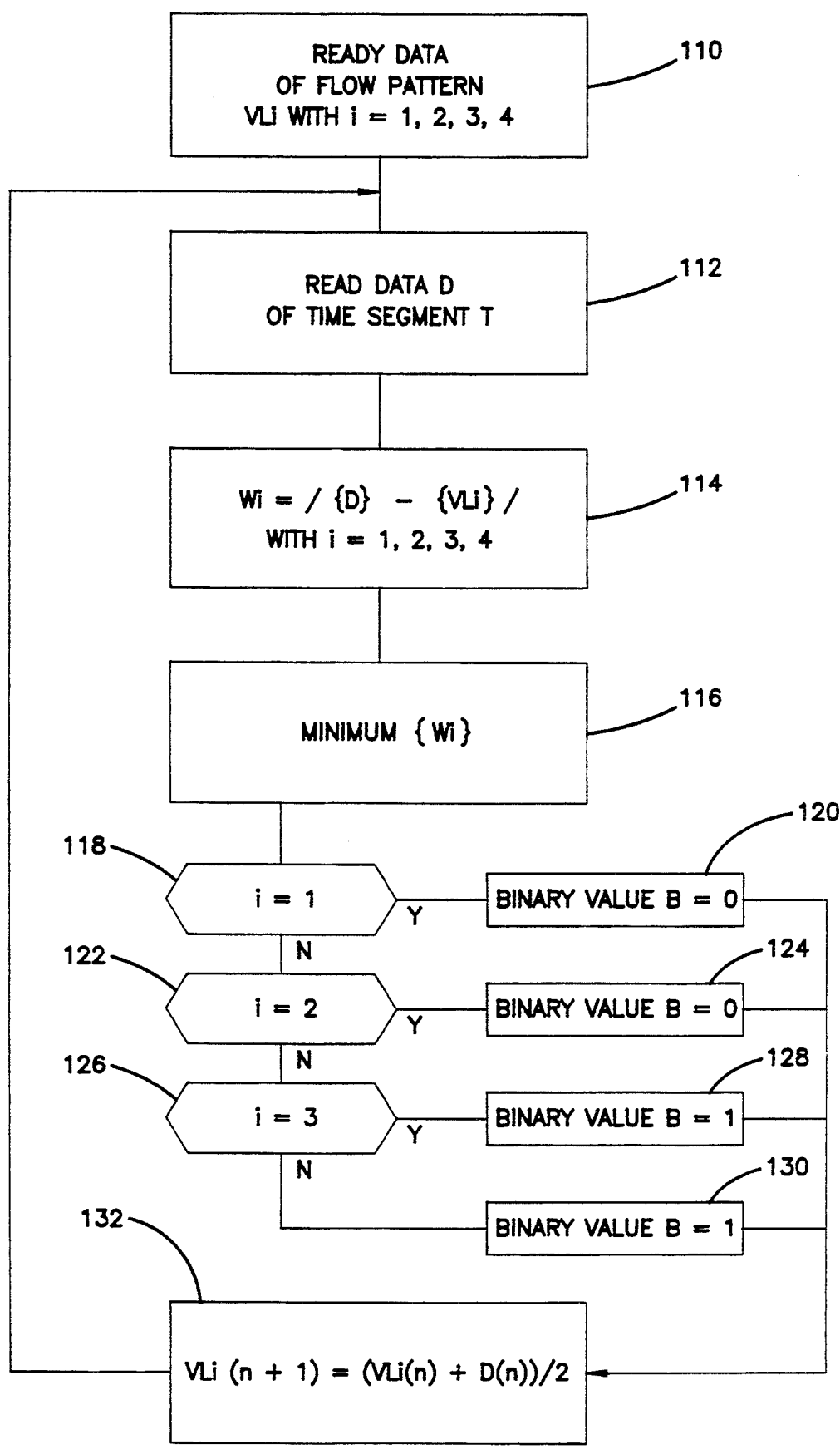
FIG. 11 is a flow chart representation of the steps for evaluating binary information by comparison with curve patterns.

In FIG. 11 the necessary process steps to interpret information by comparison with curve patterns are displayed in a flow chart. In step 110 the data of the curve patterns are first readied in a data field. Then the data of the output signal U of one time interval T are read into the microprocessor 38 in process step 112. In step 114 these data are compared with the data of the curve pattern $VL_i$, i.e., the total deviations or rather the quadratic deviations $W_i$ with i=1, 2, 3, 4 are established. The corresponding curve pattern $VL_i$ bears the greatest similarity to the actual waveform of the output signal U. In the process steps 118 to 130 the binary value is released which is assigned to the curve pattern $VL_1$ through $VL_4$ that was identified.

Subsequently the chosen curve pattern $VL_i$ is corrected in process step 132. For this purpose the deviations of the data of the curve pattern $VL_i$ from the actual data D of the output signal U are established, and the current data of the curve pattern corrected by half of these deviations. In the further course of information evaluation the curve pattern thus attained is continually corrected, so that its curve continually approaches the curve of the output signal U. Through this the deviations $W_i$ of corresponding curves of the output Signal U from the corresponding curve pattern $VL_i$ are minimized, and the certainty of the choice for one of the curve patterns $VL_i$ is thus increased.

Figure 12:
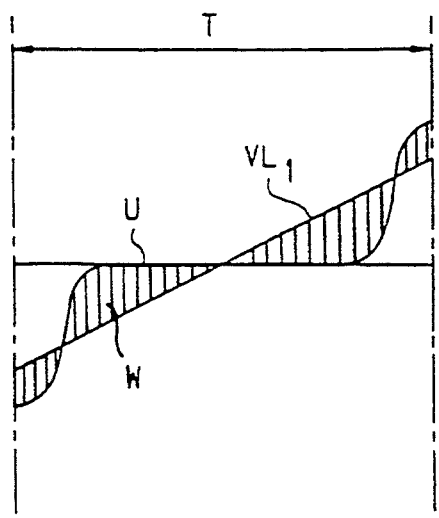
FIG. 12 shows a corrected curve pattern.
Figure 12A:
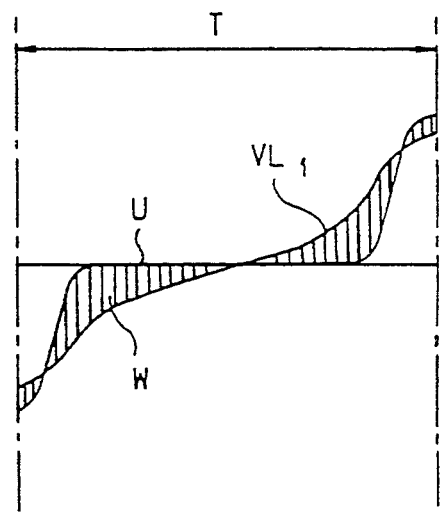

The effects of this correction are represented in FIG. 12. In the left portion of the figure, the curve pattern $VL_1$ is depicted by a straight line with a positive slope. Through correction of the straight line by half of the deviations of the curve pattern $VL_1$ form the output signal curve U, a curve pattern $VL_1'$ (right portion of the figure) is created which matches the actual curve of the output signal U better. The deviation W' from the output voltage curve U is correspondingly smaller than the one in the left portion of the figure.

With one version of the evaluation through comparison with curve patterns the choice of the curve patterns can be based on the previously detected output signal curve U. In this case the consideration that the signal curve of consecutive curve segments is more or less continuous is utilized. In practice this means that while an output signal curve U corresponding to portion a) of FIG. 10 can be followed by a segment of the voltage signal curve U corresponding to the binary value 1, as shown in portion b), it cannot be followed by a signal curve as shown in portion c). The same applies to signal curve U with the binary value 0, i.e., the voltage curve U in portion a) can only be followed by a signal curve U starting with a positive voltage. Hence the comparison following an already evaluated voltage curve U with a curve pattern of $VL_1$ through $VL_4$ can be narrowed down to those patterns which correspond with the last voltage value of the previous time segment T.

Figure 13:
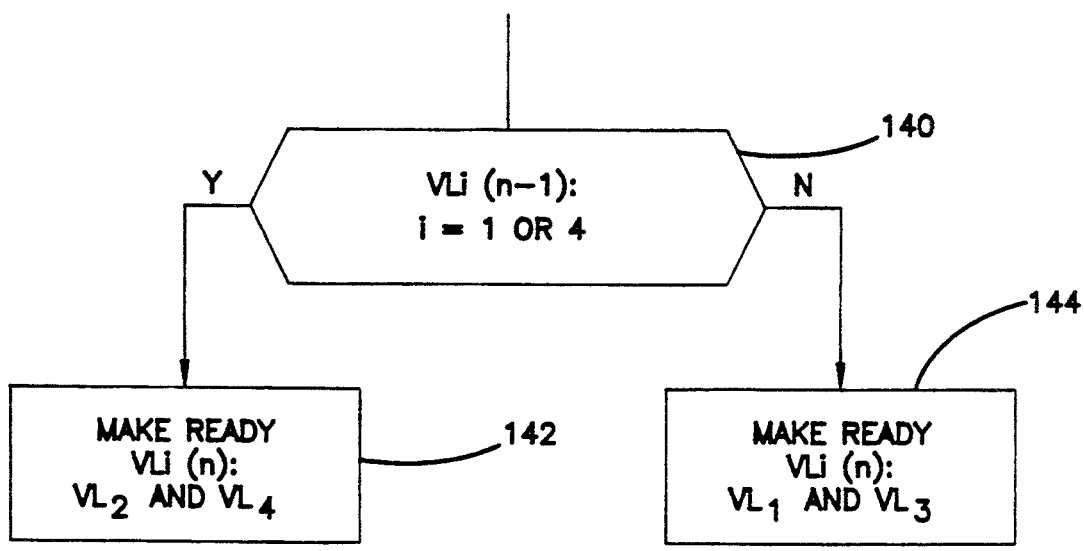
FIG. 13 is a flow chart representation showing steps for selecting suitable curve patterns.

The corresponding process steps for the selection of the applicable curve patterns are seen in the flow chart in FIG. 13. In a first comparison step 140 is branched depending on the curve pattern $VL_i$ determined for the previous comparison n−1. If the previous fitting pattern was chosen as $VL_1$ or $VL_4$, then the curve patterns $VL_2$ and $VL_4$ will be prepared in process step 142 for the following comparison n. Otherwise the curve patterns $VL_1$ and $VL_3$ will be used for the comparison (process step 144). Through the preselection of applicable curve patterns the number of comparisons that need to be executed is reduced and the information evaluation is thus speeded up.

Figure 14:
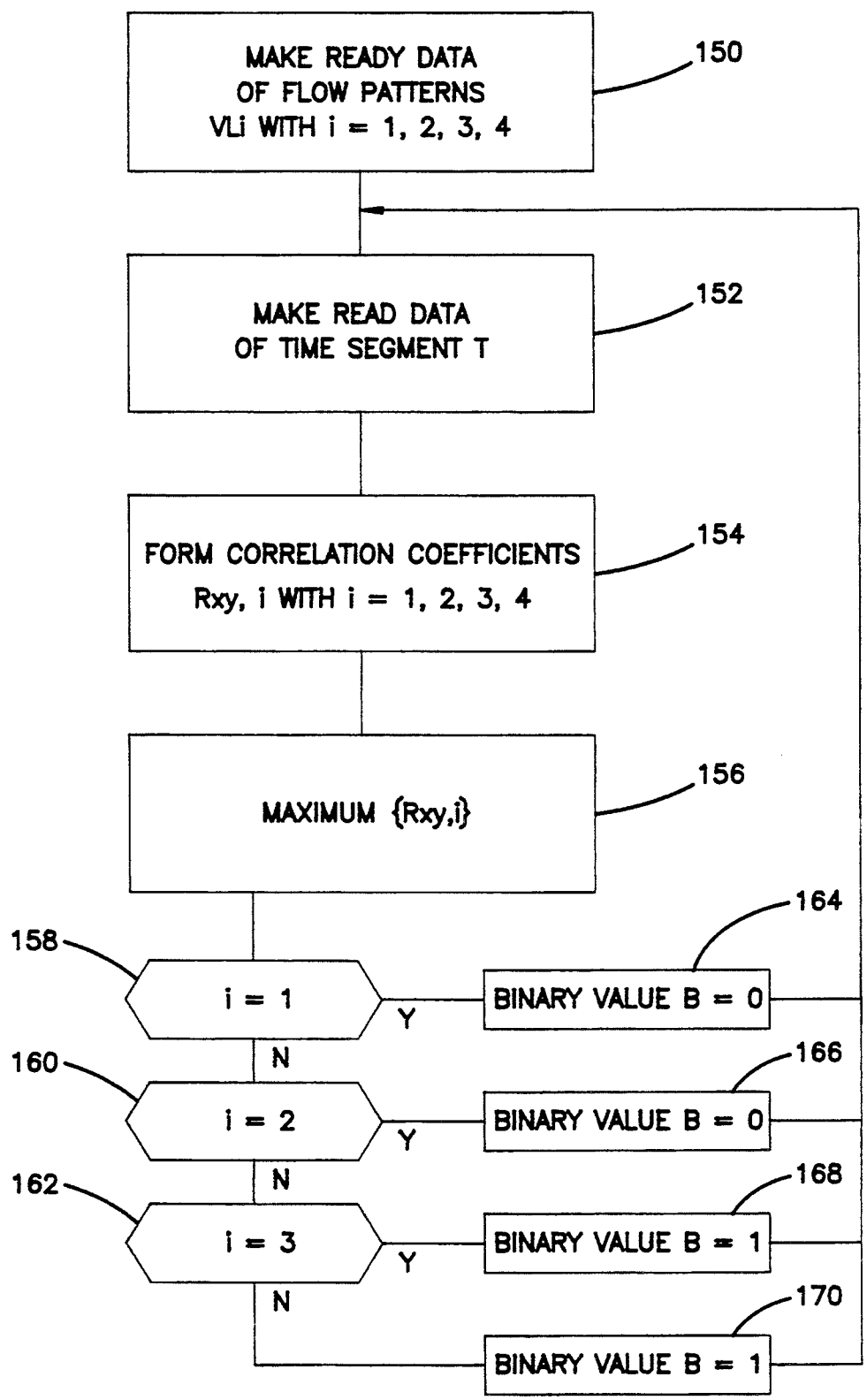
FIG. 14 is a flow chart representation for an evaluation process in which correlation coefficients are calculated.

In FIG. 14 a further version of the evaluation of binary information through comparison with curve patterns is represented in a flow chart. In this version, correlation coefficients Rxy,i are generated in order to determine the similarity between the actual curve of the output voltage U during one time segment T and the curve patterns $VL_i$. For this purpose, the data of the curve patterns $VL_i$ are prepared in a data field during process step 150. In the next process step 152, the data of the output signal U of a contemplated time segment T are read into the microprocessor 38.

In the following step 154 a normalized correlation coefficient Rxy,i at i=1, 2, 3, 4 is generated from the data of each of the four curve patterns $VL_i$ and the data of the output signal U, according to the formula $$Rxy,i = \frac{(x_k - x)(y_k - y)}{(x_k - x)^2 (y_k - y)^2}$$

Wherein:
$x_k$ data of the curve pattern VL with the counting variable k,
x the median value of all values $X_k$,
$y_k$ data of the output signal U, y the median value of all values $y_k$, k the counting variable from 1 to n, with n as the highest value of the counting variable k.

The correlation coefficients Rxy,i thus determined have a value range of −1 to +1. The value +1 indicates a perfect match between the output signal voltage curve and the corresponding curve pattern $VL_i$. The value −1 indicates that the voltage curve U and the curve of the curve pattern $VL_i$ are completely opposite. In practice, the calculated correlation coefficient Rxy will generally lie between these extreme values. Out of the four curve patterns $VL_1$ through $VL_4$ considered, the curve pattern $VL_i$ with the correlation coefficient Rxy that approaches +1 most closely is the most similar to the waveform of the output voltage. The binary value B belonging to this curve pattern $VL_i$ is then released as the valid binary value B The formation of the maximum value out of the four correlation coefficients Rxy,i occurs in process step 156. In the following steps 158 to 170, the binary value B belonging to the curve pattern $VL_i$ with the maximum coefficient Rxy is released. The evaluation is then branched to process step 152 and the procedure is applied to the next time segment T. During the evaluation through comparison by correlation coefficients the process steps represented in FIGS. 11, 12 and 13 as well as the process steps for correction of the curve patterns $VL_i$ and the selection of the curve patterns $VL_i$ can of course also be applied.

We claim:

1. A method for evaluating binary information stored on the magnetic track of a magnetic storage card in the form of flux changes in a two-frequency code, in which the magnetic storage card is scanned by relative movement produced between the magnetic storage card and an electromagnetic transformer and an output signal induced by the magnetic flux changes and having extreme values of differing types is generated by the electromagnetic transformer, the method comprising the steps of:

performing a calibration at the beginning of the scanning operation with constant preliminary information stored on the card and determining a calibrated time interval;

registering a time curve of the output signal in the calibrated time intervals;

detecting an extreme value in the registered time curve; and evaluating the relationship of the type of the detected extreme value and the type of a previously determined extreme value to obtain information stored on the magnetic storage card.

2. The method in accordance with claim 1 wherein the step of detecting is performed during a given time segment.

3. The method in accordance with claim 1 wherein the step of detecting is performed within a given time segment which is shorter than one-third of the calibrated time interval.

4. The method in accordance with claim 1 and further comprising the step of determining a step value and the step of determining the type of a selected extreme value through comparison of the selected extreme value with the step value.

5. The method in accordance with claim 4 wherein the step of determining the step value comprises computing the arithmetic mean of the output signal over a predetermined period of time.

6. The method in accordance with claim 4 and further comprising the step of modifying the step value after a detected extreme value by a predetermined amount such that the distance from the last detected extreme value is increased.

7. The method in accordance with claim 1 wherein determining a calibrated time interval comprises the step of determining time intervals between binary bits of the constant preliminary information and generating a calibrated time interval corresponding to a median time interval generated from the time intervals determined from the constant preliminary information.

8. The method in accordance with claim 1 and further comprising the step of comparing the time between two successive extreme values pertaining to the binary value 0 with the calibrated time interval and the step of correcting the calibrated time interval when the time measured between the two extreme values pertaining to the binary value 0 is not equal to the calibrated time interval.

9. The method in accordance with claim 8 wherein said step of correcting the calibrated time interval comprises the step of correcting the calibrated time interval by a value equivalent to one-half of the deviation of the calibrated time interval from the time interval measured between successive extreme values of the binary value 0.

10. The method in accordance with claim 1 and further comprising the step of converting the output signal into digital values at predetermined time points within each calibrated time interval and the step of determining the number of digital values between digital extreme values.

11. The method in accordance with claim 10 and further comprising the step of comparing successive digital values and determining a maximum extreme value when adjacent digital values are smaller and determining a minimum extreme value when adjacent digital values are larger.

12. The method in accordance with claim 10 wherein the step of converting the output signal into digital values comprises defining time points for analog-to-digital conversion as $Tad < (16vd)^{-1}$ wherein Tad defines the distance between time points in seconds, v is the relative velocity between the magnetic card and the electromagnetic transformer in mm/s, and d is the flux change density on the magnetic track in 1/mm.

13. The method in accordance with claim 1 and further comprising the step of converting the output signal into digital values at predetermined time points and the step of storing the digital values in order of their appearance and the step of evaluating the digital values.

14. The method in accordance with claim 13 wherein the step of evaluating the digital values comprises evaluating the digital values as they occur serially using differing valuation processes to produce a set of binary data in each evaluation process.

15. The method in accordance with claim 14 and further comprising the step of comparing several sets of binary information with each other to generate comparison output data and the step of performing a plausibility test on the comparison output data.

16. The method in accordance with claim 15 and further comprising the step of selecting an evaluation process for further evaluation of digital values on the basis of results obtained from performing the plausibility test.

17. A method for evaluating binary information stored on the magnetic track of a magnetic storage card in the form of flux changes in a two-frequency code in which the magnetic storage card is scanned by relative movement produced between the magnetic storage card and an electromagnetic transformer and a time varying output signal induced by the magnetic flux changes and having extreme values of differing type is generated by the electromagnetic transformer, the method comprising the steps of:

performing a calibration at the beginning of the scanning operation with constant preliminary information stored on the card and determining a calibrated time interval;

detecting successive extreme values in a time curve of the output signal;

measuring the time interval between extreme values of differing types;

evaluating the relationship of the measured time interval and the calibrated time interval; and starting a next time measurement at a next detected extreme value if it is determined in the step of evaluating that the measured time interval is not shorter than the calibrated time interval.

18. The method in accordance with claim 17 wherein the step of evaluating comprises the step of comparing the measured interval with a value equal to 0.7 times the value of the calibrated time interval and a next measurement is started at a next detected extreme value if the measured time interval is not shorter than 0.7 times the value of the calibrated time interval.

19. The method in accordance with claim 18 and further comprising the step of performing error detection on information resulting from the step of evaluating and upon detection of an error executing the step of comparing the measured time interval with a value falling between 0.66 times the calibrated interval and 0.75 times the calibrated interval.

* * * * *